United States Patent Office 3,464,783
Patented Sept. 2, 1969

3,464,783
PROCESS FOR WORKING UP ORES WHICH CONTAIN TUNGSTEN
Győző Patzauer, Budapest, Hungary, assignor to Egyesult Izzolampa es Villamossagi Reszvenytarsasag, Budapest, Hungary
No Drawing. Filed Dec. 11, 1964, Ser. No. 417,771
Claims priority, application Hungary, Dec. 20, 1963, EE 1,061
Int. Cl. C22b 57/00
U.S. Cl. 23—18                                   8 Claims

ABSTRACT OF THE DISCLOSURE

A process for recovering tungsten compounds having a purity of at least 99.999 percent from tungsten-containing ores. The ore is preoxidized with hydrogen peroxide. This is followed by decomposition in a rotary drum during constant grinding with alkali hydroxide, and simultaneous electrolysis. The resulting alkali tungstate solution is transformed directly into calcium tungstate and then, in the presence of hydrochloric acid and a metallic catalyst, into tungstic acid. This acid is then transformed, in the presence of ammonium hydroxide or gaseous ammonia, into ammonium paratungstate, which is dried and transformed into ammonium paratungstate crystals.

---

Several processes are known for the working up of ores which contain tungsten. They have the common feature that the ore is decomposed, then the alkali tungstate which is obtained is converted by means of a long series of purification processes and various tungsten compounds into a pure tungsten compound, and this pure tungsten compound is then reduced to tungsten metal in a manner known in tungsten technology.

This long series of working processes, the details of which will be discussed later, is made necessary by the fact that the tungsten ore (generally iron-manganese wolframite) contains approximately 13 other elements in addition to tungsten, these being primarily iron, molybdenum, silicon, phosphorus and arsenic. When using the usual decomposition process, these other elements were for the major part also decomposed, and these impurities could only be removed by long series of purification processes and by the alkali tungstate being transformed repeatedly into another tungsten compound. Because of these long series of processes, impurities, even though in small quantity, also necessarily entered the refining substance through the chemicals used for the individual processes.

The decomposition process as such was effected with the aid of a lye or acid, but the electrolytic process using a diaphragm is however also known. All known decomposition processes had the disadvantage that they are not able to prevent the decomposition of a large amount of the divalent iron present in the tungsten ore nor can they convert this iron into the trivalent form. The undecomposed divalent iron has an inhibiting action on the period of the decomposition process and in fact also on the yield. The attempt has in fact been made to obtain assistance in this respect by supplying air during the decomposition period. On account of the large specific surface and on account of the comparatively low oxygen content of the air, the oxidation was only partially achieved and in addition also took place extremely slowly, so that the divalent iron was able to develop an extremely high disturbing effect, just in the decisive phase of the decomposition process. The known alkali decomposition processes have additional disadvantages in that a starting product ground to the fineness of powder and a lye excess of at least 50% are required.

This invention has for its object an industrial process for the working of tungsten-containing ore which is simpler than the processes used at the present time and obviates the disadvantages referred to above, said new process also supplying a product of even greater purity and being more economical than the processes used at present.

The basic principle underlying the development of this invention is that a product of higher purity than that obtained by the known processes can only be produced if both the impurities which are present between the crystal lattices of the material and which are comparatively easy to eliminate, are removed to a more complete degree than hitherto, and provision is also made for the elimination of those impurities which would be incorporated into the crystal lattice of the material.

Since the elimination of these latter impurities is very difficult (the impurities can generally only be eliminated, for example by zone melting, from the crystal lattice of the metal), my efforts were directed to preventing to a great extent the decomposition of the impurities or eliminating to a great extent the decomposed impurities already present during the decomposition process. This should be contrasted with the hitherto usual general practice, the basis of which was considered to be the elimination of the decomposed impurities, with the decomposition thereof only being prevented to a small extent. Regarding the further processing of the decomposed tungsten compound, it was kept in view that, partly for the purpose of reducing the subsequent contamination to a minimum and partly for reasons of economy, the pure tungsten compound capable of being reduced to metal should be obtained by the smallest possible number of processes and thus a large part of the intermediate working operation should be excluded. In addition, a more effective solution than those hitherto used for eliminating impurities with the known processes should be used. With the assistance of the following additional knowledge, it has been possible for me to develop my process, taking into account the above basic considerations.

One of the most important problems with the decomposition, the presence of divalent iron, can be reliably overcome, or this iron can be transformed into trivalent iron, if the ore is firstly subjected to a pretreatment oxidation and secondly further oxidation during the decomposition is effected by oxygen forming on a positive pole because of direct current conducted through the decomposition solution. Nascent hydrogen simultaneously forming at a negative pole, on the one hand reduces the oxidized iron manganese oxide to ferromanganese and as a consequence the speed of decomposition thereof falls considerably. On the other hand, the hydrogen forms readily volatile hydrogen compounds with the phosphorus and arsenic which are present and these compounds escape. A large part of the other metal impurities passing over into the solution is also precipitated galvanically because of the direct current.

The exploitation of the aforementioned advantages is still further improved in practice if the decomposition is carried out during a constant grinding in a rotary drum or kiln, whereby the time required for carrying out the decomposition process is shortened, thus further reducing the possibility of the impurities dissolving.

During the further processing of the alkali tungstate which is obtained, the technical alkali tungstate is directly converted into calcium tungstate in a manner known per se, omitting all intermediate processes. The calcium tungstate is precipitated, centrifuged and dried and then introduced into hydrochloric acid which may be of high concentration and in the presence of a metal catalyst, and the tungstic acid is separated. In this manner, the molybdenum still present remains dissolved in the form of molybdenum oxychloride, on account of its high solubility, and the arsenic still present is transformed into arsenic chloride.

Ammonium paratungstate is recovered from tungstic acid with the aid of gaseous ammonia, and centrifuged or suction filtered. Drying of this product, which has high water content, is expediently effected with absolute alcohol or with another hygroscopic medium. While the solid residue of the large quantity of water evaporating during the direct drying of the product having a high water content (20 to 25%) definitely contaminates the end product, the surface tension of the water on the surface of the crystals is broken down by washing with alcohol or other hygroscopic media so that the product only contains 1 to 2% of water after the washing and this is evaporated extremely quickly by drying.

On the basis of the foregoing, my process is primarily characterised by the following:

(1) Before the decomposition, oxidation processes are introduced and the alkali decomposition is carried out in the presence of direct current.

(2) The oxidation before the decomposition is preferably carried out with the aid of hydrogen peroxide.

(3) The decomposition is preferably carried out while constantly grinding in a rotary drum or kiln.

(4) The technical alkali tungstate obtained by decomposition is directly transformed exclusively by way of calcium tungstate and tungstic acid into ammonium paratungstate.

(5) The preparation of the calcium tungstate as tungstic acid with the aid of hydrochloric acid takes place in the presence of a metal catalyst and preferably with concentrated hydrochloric acid.

(6) The drying of the ammonium paratungstate is carried out with the aid of alcohol or other hygroscopic media.

The details of the process are set out and explained in the following description by way of example, but the invention is not limited to this example.

Before the process according to the invention is fully described, the known industrial processes are briefly discussed for the purpose of comparison.

According to one of the processes, the ore is melted at a temperature of about 900–1000° C. with sodium carbonate and then washed with hot water. Another process carries out the decomposition with an acid, but this is not widely used. According to the most usual industrial process, the ore is decomposed with a 40% hot alkali solution. With this process, the decomposition takes about 8 hours and yields a very impure product. The decomposition is followed by the deposition lasting 24 hours. This is followed by the separation of arsenic and phosphorus with magnesia mixture, and then a fresh deposition lasting a very long period. The next step for lowering the molybdenum impurity lasts about 48 hours. The filtered solution which is obtained is thereafter transformed into calcium tungstate in a process lasting about 8 hours, and then the tungstic acid is recovered over the same period of time with hydrochloric acid and nitric acid. The recovery of the paratungstate from tungstic acid is effected with an ammonia solution, which complete process, including deposition, filtering, drying, etc., takes about another 48 hours. The complete process therefore requires 7 whole days.

By comparing with the processes mentioned above, the process according to the invention requires altogether about 36 to 40 hours and yields a tungsten with the purity of 99.999%.

EXAMPLE 70 kg. of stainless steel balls having a size of 5–40 mm., are put into a rotary grinding drum, the wall of which is made of stainless steel adapted to withstand contamination of lye. Thereafter 100 kg. of a crushed tungsten containing ore, e.g. iron manganese wolframite, are put into the drum and 50 litres of water are added. Thereafter, while the drum is rotating steadily, about 5 litres of concentrated (33%) hydrogen peroxide are supplied as an oxidizing agent. After a pretreatment lasting about 30 minutes, 40 kg. of solid sodium hydroxide is introduced in stages into the drum and simultaneously the direct current is switched on. The cathode is separately pushed into the upper end of the drum, while the grinding balls can serve as anode.

Due to the very intensive mixing and grinding, which is further assisted by the gases evolved because of the electric current, the decomposition time can be reduced to a few hours. The purpose of the gases formed has already been explained.

The decomposition is followed by a separation, in the course of which the formed alkali tungstate is separated from iron-manganese oxide. The purifying process using magnesia mixture and the usual molybdenum separation process which usually follow in the known processes are omitted. The sodium tungstate which is obtained from the separation process is diluted with water up to a specific weight of 1.28 and is converted by addition of calcium nitrate or calcium chloride (in stochiometric quantities) into calcium tungstate, the product is centrifuged and preferably dried.

The calcium tungstate is treated with concentrated hydrochloric acid (having a concentration of 7–9 times the normal concentration) in the presence of a metal catalyst, tungstic acid being that separated out in one to two hours. As a catalyst, metals having a high melting point and being insoluble in the acid such as platinum, gold, tantalum, and tungsten may be used. Alternatively, metals which are soluble in the acid and while dissolving, cause a strong $H_2$ development such as Zn may be used. The tungstic acid is thoroughly separated from the hydrochloric acid, washed, and then, with the last wash water remaining, converted with a supply of gaseous ammonia into ammonium paratungstate. The amount of the gaseous ammonia is chosen so that the pH of the solution should reach about 12. Afterwards the solution is evaporated after filtering. The ammonium paratungstate crystals obtained after an evaporation up to 80% in volume, which are centrifuged or remains hanging on the suction filter, is treated with alcohol or with other hygroscopic agents, so that the 20–25% of water which is on the surface is extracted therefrom. In this way, the water on the crystal is eliminated and as a consequence the material will contain a total of 1–2% of water. The product thus obtained can be completely dried in 1–2 hours, leaving ammonium paratungstate having an extremely fine-grain structure.

If this ammonium paratungstate is processed in a manner known per se into metal, a tungsten with a purity of 99.999% can be obtained.

Thus, according to the invention, there is provided a process for the working of tungsten-containing ores into tungsten compounds by means of wet alkali decomposition of the ores and by processing in several stages the alkali tungstate so obtained, characterized in that an oxidizing process is carried out before said decomposition, which decomposition is effected under the simultaneous influence of an electrolyzing direct electric current on the alkaline solution, thus insuring an oxidizing effect on the one hand and a reducing effect on the other hand, for the purpose of preventing decomposition of the impurities and for promoting the elimination thereof.

I claim:
1. A process for producing ammonium paratungstate from tungsten containing ores comprising
   (a) oxidizing said ores while said ores are in an aqueous medium;
   (b) decomposing said oxidized ores by treating said oxidized ores in said aqueous medium with an alkali to form an alkali tungstate while simultaneously passing an electrolyzing direct current through said aqueous medium;

(c) separating the alkali tungstate from the aqueous medium and converting the alkali tungstate to calcium tungstate;

(d) treating the calcium tungstate with concentrated hydrochloric acid in the presence of a metal catalyst to form tungstic acid;

(e) reacting said tungstic acid with gaseous ammonia in an aqueous medium to form ammonium paratungstate; and (f) separating said ammonium paratungstate from said aqueous medium.

2. The process of claim 1 wherein the oxidation step (a) is carried out by utilizing hydrogen peroxide as an oxidizing agent.

3. The process of claim 1 wherein the decomposition of step (b) is carried out in a rotary drum under constant stirring.

4. The process of claim 1 wherein alkali tungstate is converted in step (c) to calcium tungstate by treatment with calcium nitrate or calcium chloride.

5. A process for producing an alkali tungstate from tungsten containing ores comprising (a) oxidizing said ores while said ores are in an aqueous medium;

(b) decomposing said oxidized ores by treating said oxidized ores in said aqueous medium with an alkali to form an alkali tungstate while simultaneously passing an electrolyzing direct current through said aqueous medium, and (c) separating the alkali tungstate from said aqueous medium.

6. The process of claim 5 wherein said ores are oxidized in said aqueous medium with hydrogen peroxide.

7. The process of claim 5 wherein said alkali utilized for decomposing said oxidized ores is sodium hydroxide.

8. A process for producing alkali tungstate from tungsten containing ores comprising (a) introducing said ores and water into a rotary drum so as to form an aqueous medium in said rotary drum (b) oxidizing said ores while said ores are in an aqueous medium by treating said aqueous medium with hydrogen peroxide.

(c) decomposing said oxidized ores by treating said oxidized ores in said aqueous medium with a solid alkali metal hydroxide while simultaneously passing an electrolyzing direct current through said aqueous medium to form an alkali tungstate which precipitates from said aqueous medium and (d) separating said precipitated alkali tungstate from the aqueous medium.

References Cited
UNITED STATES PATENTS

| | | | |
|---|---|---|---|
| 1,255,144 | 2/1918 | Ekeley et al. | 23—16 |
| 1,293,402 | 2/1919 | Giles et al. | 23—18 |
| 2,394,362 | 2/1946 | Burwell | 23—18 |
| 3,256,057 | 6/1966 | Burwell | 23—15 |

HERBERT T. CARTER, Primary Examiner

U.S. Cl. X.R.

23—19, 51; 204—86